United States Patent [19]

Meyer et al.

[11] Patent Number: 4,542,113
[45] Date of Patent: Sep. 17, 1985

[54] METHOD FOR PREPARING SPHEROIDAL ALUMINA

[75] Inventors: Arnold Meyer, St. Michaelisdonn; Klaus Noweck, Brunsbüttel, both of Fed. Rep. of Germany

[73] Assignee: Condea Chemie GmbH, Brunsbüttel, Fed. Rep. of Germany

[21] Appl. No.: 478,851

[22] Filed: Mar. 25, 1983

[30] Foreign Application Priority Data

Apr. 2, 1982 [DE] Fed. Rep. of Germany ....... 3212249

[51] Int. Cl.$^4$ .......................... B01J 35/08; B01J 37/00
[52] U.S. Cl. ........................................ 502/8; 502/439; 502/355; 423/626
[58] Field of Search .................... 252/448; 423/626; 502/439, 8, 355

[56] References Cited

U.S. PATENT DOCUMENTS 2,620,314 12/1952 Hoekstra ............................ 252/448
3,027,234 3/1962 Michalko ................................ 502/8
3,600,129 8/1971 Vesely et al. ...................... 423/626
4,179,408 12/1979 Sanchez et al. ..................... 502/439
4,315,839 2/1982 Bouge et al. ........................ 502/439
4,399,119 8/1983 Takumi et al. ...................... 423/626

FOREIGN PATENT DOCUMENTS 0216740 12/1980 Japan ................................. 502/439

Primary Examiner—D. E. Gantz
Assistant Examiner—Chung K. Pak
Attorney, Agent, or Firm—Thomas H. Whaley

[57] ABSTRACT

For the preparation of spheroidal alumina, an alumina sol having a solids content of more than 20 to 40% by weight of alumina is prepared from alumina hydrate, which consists of boehmite/pseudo-boehmite, by thorough stirring in aqueous dilute acid, and the alumina sol is caused in the presence of 1 to 10% by weight of urea to drop into a forming column whose top portion is filled with a liquid hydrocarbon and whose bottom portion is filled with an aqueous solution of ammonia and which is held at room temperature, and the thus formed spheroidal particles are dried and activated. The resultant spheroidal particles may also be subjected to a per se known aging treatment.

7 Claims, No Drawings

METHOD FOR PREPARING SPHEROIDAL ALUMINA

The present invention relates to the preparation of spheroidal alumina according to the oil-drop method.

Alumina of spheroidal shape having a large surface area and high crush strength is preferred for use as a catalyst or carrier in a fixed bed. The spheroidal shape of the alumina particles permits uniform packing of the material bed, whereby variations in the pressure drop through the bed are minimized and channelling of the feed stream of reaction components is substantially eliminated. Likewise, the spheroidal shape offers considerable advantages in a fluidized bed, where the physical stability and strength of the spheroidal alumina particles are of still greater significance than in the fixed bed.

The spheroidal alumina particles should in particular have a uniformly high strength, because the very finely divided material resulting from the decomposition of individual particles will cause an excessive increase in the pressure drop through the bed and especially in the fixed bed undesired movement of the particles in the bed will cause increased attrition, thus resulting in further losses of catalyst or carrier substance.

A preferred method of preparing spheroidal alumina particles having a diameter in the range of 0.8 to 3.2 mm is the so-called oil-drop method according to the U.S. Pat. No. 2,620,314. An acid alumina hydrosol is mixed with a gelling agent which acts as a weak base and releases ammonia with increasing temperature. This mixture is caused to drop into a hot oil bath. The oil used normally is a forming oil, preferably light gas oil because of its high interfacial tension relative to water. Each drop of the oil-insoluble mixture of alumina hydrosol/gelling agent contracts in the oil bath due to its tendency to take—at a given volume—a shape having a minimum surface, resulting in a spheroidal shape, and due to gravity falls to the bottom.

On account of the temperature of the oil bath the spheroidal alumina particles will at the same time be gelatinized, whereby a stability of the spheroids sufficient for further processing will be obtained. Thereupon the spheroidal particles are aged, which normally takes place in forming oil and subsequently in an aqueous solution of ammonia, washed in water, dried, and normally calcined in an oxidizing atmosphere at a temperature between about 425° and 750° C.

Recent developments relate to the preparation of spheroidal alumina of high density, large surface area, and high crush strength in accordance with the specified oil-drop method. According to the DE-OS No. 2,943,599 and the DE-OS No. 2,945,755, hexamethylenetetramine as an ammonia precursor and an acid alumina hydrosol are mixed together below the gelling temperature and the mixture is caused to drop into a hot oil bath where the spheroidal shape will be created and the hexamethylene tetramine will decompose to form ammonia. The resulting ammonia causes coagulation of the sol and hardening of the spheroids. To complete the coagulation, aging is then performed for a period of up to 24 hours in an aqueous ammonia solution containing ammonia salts. Thereupon washing, drying and calcining are performed. The resulting alumina spheroids have a strength of up to about 100N and according to the example of the DE-OS 2,945,755 have mean bulk densities—depending on the concentration of ammonium chloride—of from 0.64 g/cm$^3$ with a surface area of 206 m$^2$/g to 0.705 g/cm$^3$ with a surface area of 179 m$^2$/g. Particularly high bulk densities are therefore only obtained with reduced surfaces, and vice versa.

According to the U.S. Pat. No. 4,116,882 an aluminium oxide slurry prepared by hydrolysis of aluminium alkoxides is gelatinized with acetic acid, formic acid or nitric acid until the slurry has a viscosity of about 200 to about 60 cP, and it is only then caused to drop into a column containing a hydrocarbon oil with a bottom layer of an aqueous solution of ammonia. According to this method slurries are used which have a solids content of only 10 to 20% of aluminium oxide. Higher concentration slurries cannot be used, because in that case gels will be formed and it is not possible to prepare fluid dispersions. Due to the low solids content there will be considerable shrinkage when the spheroidal particles are dried. Tension cracks will occur which significantly reduce the mechanical stability of the spheroids.

Proceeding from the prior art, the present invention is based on the object of providing an improved and simplified process for the preparation of spheroidal alumina particles according to the oil-drop method, whereby spheroidal alumina particles of high strength or—in the case of the usual strength—high pore volume and substantially free from tension cracks can be obtained.

In accordance with the present invention the above-specified object is solved by a method which is characterized by preparing from pseudo-boehmite/boehmite in an aqueous dilute acid by means of thorough stirring an alumina sol having a solids content of more than 20 to 40% by weight of alumina, causing the resultant alumina sol to drop into the forming column held at room temperature, and drying and activating the thus formed spheroidal particles. If desired, the formed spheroidal particles may be aged.

For the preparation of the alumina sol it is provided according to the invention that alumina hydrates obtained from the hydrolysis of aluminium alkoxides, which include boehmite and microcrystalline pseudo-boehmite in amounts of 10 to 40% by weight, especially 20 to 30% by weight, of boehmite alumina with a specific surface area of from 140 to 200 m$^2$/g, preferably about 150 to 180 m$^2$/g, and specifically a primary crystallite size of 60 to 65 Å (measured by the 020 reflex), and containing 90 to 60% by weight, especially 80 to 70% by weight, of microcrystalline pseudo-boehmite having a specific surface area of 200 to 300, preferably 230 to 270 m$^2$/g, and especially a primary crystallite size of 35 to 40 Å (measured by the 020 reflex). Such alumina hydrates are commercially available under the tradename Pural ® (manufactured by Condea Chemie GmbH, Brunsbüttel).

By means of dilute acid at a concentration of about 1 to 5%, preferably 1 to 3%, or mixtures of such acids the alumina hydrate is converted into a dispersion, wherein as in the prior art especially nitric acid, hydrochloric acid, acetic acid, formic acid are used either singly or in mixtures with one another. The alumina/acid weight ratio should be 1/0.1 to 0.02, especially about 1/0.04 (based on a 100% acid).

As in the prior art, the forming column is filled with 50 to 90% by volume of an aqueous solution of NH$_3$ at an NH$_3$ concentration of 1 to 10%, preferably 5 to 9%, especially about 8%, and 10 to 50% by volume of a hydrocarbon oil such as diesel oil, gas oil, and kerosine.

The alumina sol having an alumina content of more than 20% of Al$_2$O$_3$, especially 25% and more, is caused to drop through calibrated apertures into the forming column, wherein the temperature of the column content is 10° to 40° C., preferably 20° to 25° C.

To the alumina sol there are added 1 to 10% by weight—based on the total weight of the sol—of urea, especially 3 to 5% of urea. The alumina sol may also be prepared in the presence of corresponding quantities of urea. The addition of urea is not intended for gelatinizing but for stabilizing and thus extending the processability of the dispersion. Ammonia precursors usually added by the prior art, such as ammonium acetate or urotropine, also in mixtures with urea, cannot be used.

To the alumina sol there may also be added hydrocarbons such as gas oil, kerosine and suitable emulsifiers such as alcohol ethoxylates, whereby the porosity and the surface of the spheroids are increased. In this respect it has been found that the properties of the spheroids to a certain extent are also influenced by the HLB of the emulsifier, so that only such emulsifiers should be used which have a beneficial effect on the properties of the spheroids.

The spheroidal alumina particles may be washed, e.g. with petroleum ether, hexane, or benzine. However, a washing operation is not absolutely necessary.

The separated spheroidal alumina particles may be subjected to an aging phase, but this is not necessary. The spheroidal alumina particles are dried and activated. Normal drying periods are from 1 to 3 hours at 90° to 120° C. and from 2 to 24 hours at 20° to 60° C., for instance 10 hours at 60° C. and/or 3 hours at 120° C.

Activation takes place for about 1 to 20 hours at 480° to 1050° C., preferably for 1 to 5 hours at 500° to 750° C., for instance for 3 hours at 550° C.

A typical alumina sol according to the present invention is prepared from 35% by weight of alumina hydrate of the boehmite/pseudo-boehmite type (Pural ®SB70) and 65% by weight of 1.7% nitric acid to which also 5% by weight of urea is added. The resultant mixture is caused to drop into a forming column to form spheroids, wherein 70% of the volume of the forming column are filled with an 8% solution of NH$_3$ and 15% thereof are filled with gas oil. The resultant spheroids, which are initially formed because of the high interfacial tension of the oil relative to the sol in the top phase, drop to the bottom of the column while gelatinizing in the ammonia phase. They may be aged for a period of up to 20 hours in an 8% solution of ammonia. Subsequently the resultant spheroids are dried, e.g. for 10 hours at 20° to 60° C. or for 3 hours at 120° C. Thereupon they are activated for 3 hours at 550° C.

After activation at 550° C. and in dependence on the additives such as kerosene and emulsifier, the resultant spheroidal alumina has a surface area of from 220 to 250 m$^2$/g, a bulk density of from 0.45 to 0.75 g/ml, and a crush strength of up to 200N/spheroid. Thus the prepared spheroidal alumina has a very high mechanical stability as compared to that of spheroidal alumina carriers prepared in accordance with the prior art, which permit only crush strengths of up to about 100N. Among other things, this is probably due to the fact that no tension cracks are formed during the drying operation.

EXAMPLE 1

100 g of alumina hydrate consisting of 30% of boehmite having a primary crystalline size of 60 to 65 Å (measured by the 020 reflex) and a specific surface area of 180±20 m$^2$/g and of 70% of microcrystalline pseudo-boehmite having a primary crystallite size of 35 to 40 Å (measured by the 020 reflex) and a specific surface area of 250±20 m$^2$/g, was stirred into 170 g of 1.7% nitric acid. The nitric acid also contained 15 g of urea. After stirring for 10 minutes, the sol was fed in the form of drops having a diameter of 4 to 5 mm into a forming column of a length of 1 m at a temperature of 20° to 25° C. 70% of the forming column was filled with an 8% solution of ammonia to which 0.1% of a wetting agent, viz., Alfol 610—4.5 EO, had been added, and 15% of the forming column was filled with gas oil. The green spheroids discharged from the forming column were pre-dried for 10 hours at 60° C., dried for 3 hours at 120° C., and subsequently activated for 3 hours at 550° C. The thus obtained spheroids had the following characteristics:

diameter: 2–3 mm
crush strength: 150N/spheroid
specific surface area: 220 m$^2$/g
pore volume: 0.45 ml/g
bulk density: 0.66 g/ml
tension cracks: none
attrition: stable 100% of the alumina of the spheroid was present in the gamma-phase. The fluidity of the sol lasted for at least 5 hours.

EXAMPLE 2

The same steps as in example 1 were carried out. No urea was added, however. The fluidity of the sol was only 5 minutes so that only a few spheroids could be prepared therefrom; the characteristics thereof correspond to those specified in example 1.

EXAMPLE 3

The same steps as in example 1 were carried out. However, 100% of the alumina hydrate consisted of microcrystalline pseudo-boehmite as described in example 1. The fluidity of the sol was only 5 minutes. Thereafter a gel was formed which could not be further processed to spheroidal particles.

EXAMPLE 4

The same steps as in example 3 were carried out. However, only 60 g of alumina hydrate were stirred into 175 g of 1.7% nitric acid containing 15 g of urea. Now the sol had a fluidity lasting for at least 5 hours. The spheroidal particles had similar characteristics as those of example 1, but the crush strength amounted only to c. 80N/spheroid. The spheroidal particles exhibited tension cracks, were only partially resistant to water, and did not have a uniformly round shape.

EXAMPLE 5

The same steps as in example 1 were carried out. However, 28 g of kerosene and 3 g of emulsifier (Alfol 1016—3 EO, C$_{10}$–C$_{16}$-alcohol ethoxylate) were added to the sol. The spheroidal particles exhibited the following characteristics:

diameter: 2–3 mm
crush strength: 40N/spheroid
pore volume: 0.68 ml/g
bulk density: 0.49 g/ml
specific surface area: 242 m$^2$/g
tension cracks: none

EXAMPLE 6

The same steps as in example 5 were carried out. However, only 14 g of kerosene and 1.5 g of emulsifier (Alfol 1016-3 EO) were added to the sol. The spheroidal particles exhibited the following characteristics:

diameter: 2-3 mm
crush strength: 120N/spheroid
pore volume: 0.55 ml/g
bulk density: 0.58 g/ml
specific surface area: 250 m$^2$/g
tension cracks: none

We claim:

1. In a method for preparing high density, high crush strength spheroidal alumina from alumina hydrates by the oil drop method wherein an alumina sol or dispersion is prepared by reacting alumina hydrates with a dilute aqueous acid and the alumina sol or dispersion introduced as droplets into the upper end of a forming column filled in its upper portion with a liquid hydrocarbon and in its lower portion with an aqueous solution of ammonia, the improvement comprising
    (a) preparing an alumina sol or dispersion having a solids content greater than 20 and up to 40 percent by weight alumina from alumina hydrates consisting of 10 to 40 weight percent boehmite and 90 to 60 weight percent pseudo-boehmite prepared by hydrolysis of aluminum alkoxides and characterized by a boehmite primary crystallite size of 60 to 65 Angstroms and a pseudo-boehmite primary crystallite size of 35 to 40 Angstroms as measured by X-ray diffraction 020 reflex,
    (b) incorporating 1 to 10 percent by weight urea in the alumina sol or dispersion prepared in step (a),
    (c) dispersing the resultant urea-alumina sol composition in droplet form into the forming column which is kept at room temperature, and
    (d) drying and activating the thus formed spheroidal particles.

2. A method as claimed in claim 1, characterized in that to the alumina sol there are added hydrocarbons, and emulsifiers.

3. A method as claimed in claim 1, characterized in that the aqueous dilute acid used is selected from the group consisting of nitric acid, acetic acid, formic acid and mixtures thereof.

4. A process according to claim 1 in which the dried spheroidal particles are activated by heating at a temperature of 480° to 1050° C. for a period of time within the range of 1 to 20 hours.

5. A process according to claim 1 in which the dried spheroidal particles are activated by heating at a temperature of 500° to 750° C. for 1 to 5 hours.

6. A process according to claim 1 in which the dried spheroidal particles are activated by heating at a temperature about 550° C. for 3 hours.

7. A method according to claim 1 wherein said aqueous dilute acid is nitric acid at a concentration in the range of 1 to 5 percent by weight.

* * * * *